(12) United States Patent
Gonzalez Aguirre et al.

(10) Patent No.: US 10,204,422 B2
(45) Date of Patent: Feb. 12, 2019

(54) GENERATING THREE DIMENSIONAL MODELS USING SINGLE TWO DIMENSIONAL IMAGES

(71) Applicant: Intel Corporation, Santa Clara, CA (US)

(72) Inventors: David I. Gonzalez Aguirre, Hillsboro, OR (US); Javier Felip Leon, Portland, OR (US); Ignacio J. Alvarez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/412,853

(22) Filed: Jan. 23, 2017

(65) Prior Publication Data

US 2018/0211438 A1    Jul. 26, 2018

(51) Int. Cl.
*G06T 17/20* (2006.01)
*G06T 7/50* (2017.01)
*G06T 17/00* (2006.01)

(52) U.S. Cl.
CPC .............. *G06T 7/50* (2017.01); *G06T 17/00* (2013.01)

(58) Field of Classification Search
None
See application file for complete search history.

(56) References Cited

U.S. PATENT DOCUMENTS

2004/0141638 A1* 7/2004 Acar ............... G06K 9/00201
382/131

2006/0062442 A1* 3/2006 Arnaud ................. A61B 6/505
382/128

OTHER PUBLICATIONS

Xiang et al., Beyond PASCAL: A Benchmark for 3D Object Detection in the Wild, IEEE Winter Conference on Applications of Computer Vision (WACV), 2014, 18 pages, United States.
Hartley et al., "Multiple View Geometry in Computer Vision", Cambridge University Press, second edition, 2004, United Kingdom, 673 pages.
Marton et al., General 3D Modelling of Novel Objects From a Single View, in Intelligent Robots and Systems (IROS), 2010, Taiwan, 6 pages.
Kasper et al., "The Kit Object Models Database: An Object Model Database for Object Recognition, Localization and Manipulation in Service Robotics", The International Journal of Robotics Research, 2012, United Kingdom, 8 pages.
(Continued)

*Primary Examiner* — Said Broome
(74) *Attorney, Agent, or Firm* — International IP Law Group, P.L.L.C.

(57) ABSTRACT

An example system for generating a three dimensional (3D) model includes a receiver to receive a single two dimensional (2D) image of an object to be modeled. The system includes a segment extractor to extract a binary segment, a textured segment, and a segment characterization based on the single 2D image. The system further includes a skeleton cue extractor to generate a medial-axis transform (MAT) approximation based on the binary segment and the segment characterization and extract a skeleton cue and a regression cue from the MAT approximation. The system also includes a contour generator to generate a contour based on the binary segment and the regression cue. The system can also further include a 3D model generator to generate a 3D model based on the contour and the skeleton cue.

17 Claims, 12 Drawing Sheets

(56) References Cited

OTHER PUBLICATIONS

Lowe, David, "Three-Dimensional Object Recognition from Single Two-Dimensional Images", Artificial Intelligence, 31:355-395, Mar. 1987, United Kingdom.
Burns et al., "The Nonexistence of General-case View-invariants", in Geometric invariance in computer vision, MIT Press, Cambridge, MA, USA, 1992, 17 pages.
Faugeras, Olivier, "Stratification of 3-D Vision: Projective, Affine, and Metric Representations", Journal of the Optical Society of America A; Optics, Image Science, and Vision, vol. 12, Issue 3, Mar. 1995, pp. 465-484, USA.
Lowe, David, "Distinctive Image Features from Scale-Invariant Keypoints", International Journal of Computer Vision, 60(2), 2004, Canada, 28 pages.
Roth et al., "Survey of Appearance-based Methods for Object Recognition", Technical report, Institute for Computer Graphics and Vision, Graz University of Technology, Austria, 2008, 68 pages.
Prasad et al., "Single View Reconstruction of Curved Surfaces", 2006 IEEE Computer Society Conference on Computer Vision and Pattern Recognition, 2006, 8 pages, United Kingdom.
Huang et al, "Single-View Reconstruction Via Joint Analysis of Image and Shape Collections", ACM Trans. Graph., 34(4), Jul. 2015, 10 pages, United States.
Kholgade et al., "3D Object Manipulation in a Single Photograph Using Stock 3D Models", ACM Trans. Graph., 33 (4), Jul. 2014, United States, 13 pages.
Toppe et al., "Silhouette-Based Variational Methods for Single View Reconstruction", D. Cremers et al., (eds.) Video Processing and Computational Video, 2011, 20 pages, Germany.
Oswald et al., "A Survey on Geometry Recovery from a Single Image with Focus on Curved Object Reconstruction", M. Breub et al. (eds.) Innovations for Shape Analysis, Mathematics and Visualization, 2013, 36 pages, Germany.
Gonzalez-Aguirre et al., "Eccentricity Edge-Graphs from HDR Images for Object Recognition by Humanoid Robots", 2010 IEEE-RAS International Conference on Humanoid Robots, Dec. 6-8, 2010, 8 pages, United States.
Grigorescu et al., "Contour Detection Based on Nonclassical Receptive Field Inhibition", IEEE Transactions on Image Processing, vol. 12, No. 7, Jul. 2003, 11 pages, Netherlands.

\* cited by examiner

300

400

500

700

GENERATING THREE DIMENSIONAL MODELS USING SINGLE TWO DIMENSIONAL IMAGES

BACKGROUND

Physical world objects may be digitized into three dimensional (3D) models for use in various applications. For example, the applications can include realistic games, 3D marketing, virtual and augmented reality, arbitrary-viewpoint visual recognition, robotic grasping, path planning, etc.

In some examples, three dimensional models may be generated by scanning physical objects to be modeled. For example, depth cameras may be used to scan the physical objects to produce 3D models. In some examples, 3D models may be generated using images or video of an object.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

Figure 1:
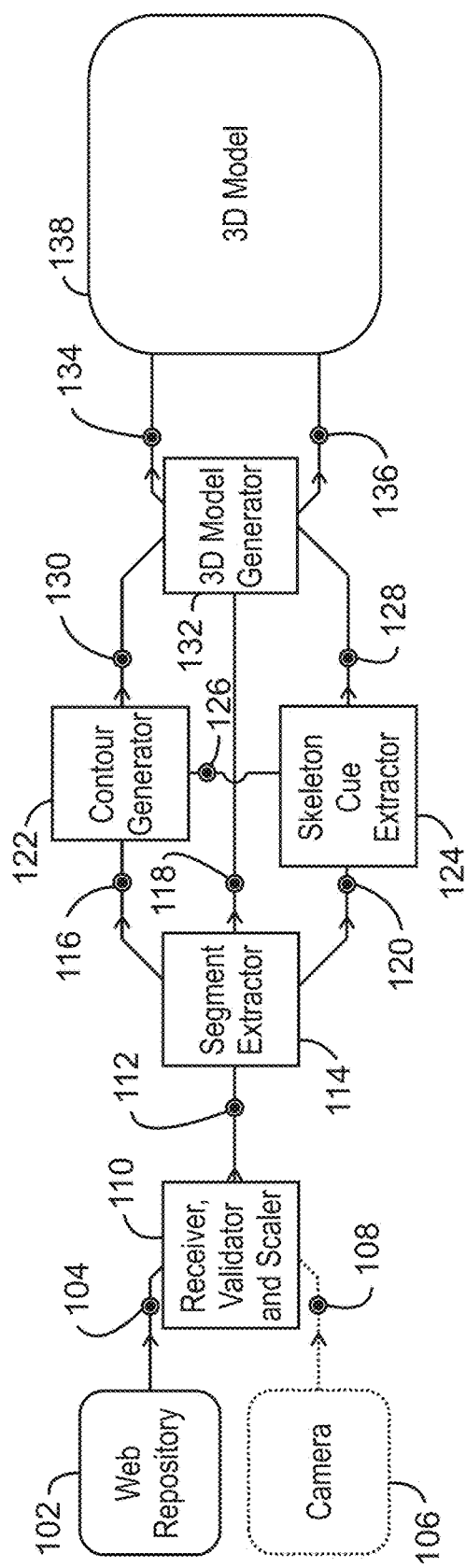
FIG. 1 is a block diagram illustrating an example system for generating three dimensional (3D) models based on single two dimensional (2D) images.

As discussed above, various methods may be used to generate 3D models of objects. However, such methods may not be efficient as each object may be separately scanned and digitized. Thus, digitizing many objects into 3D models may be both time consuming and resource intensive.

The present disclosure relates generally to techniques for generating three dimensional (3D) models from single two dimensional (2D) images. Specifically, the techniques described herein include a system, method, and computer-readable medium having instructions for generating three dimensional models of objects having structural invariants based on single two dimensional images of the objects. As used herein, a structural invariant is a common geometrical or topological property that arises from cost-effective production methods of objects such as goods and packages. For example, free-form revolution objects may have a common revolution surface resulting from glass or polyethylene injection through stretch blow molding. Free-form revolution objects, as used herein, refers to objects having radial symmetry about one axis. For example, the axis may be an axis of rotation. An example system includes a receiver to receive a 2D image of an object to be modeled. For example, the 2D image may be received from a web repository or a camera. The system includes a segment extractor to extract a binary segment, a textured segment, and a segment characterization based on the 2D image. For example, a binary segment may include a grouped set of pixels with values of 0 or 1. The system includes a skeleton cue extractor to generate a Medial Axis Transform (MAT) graph based on the binary segment and the segment characterization and extract cues from the MAT graph. For example, the cues may include a structural skeleton, an axis of rotation, and a regression cue. A regression cue may include a leaf-node of the MAT graph. The system further includes a contour generator to generate a contour based on the binary segment and the regression cue. For example, the contour may be a function describing the shape of the binary segment. The system includes a 3D model generator to generate a 3D model based on the contour, the textured segment, and the axis of rotation. For example, the 3D model may be an unlimited resolution 3D model. In some examples, the system may also include a mesh generator to generate a mesh of any resolution and amount of tessellation based on the 3D model.

The techniques described herein thus may enable unlimited-resolution 3D models to be generated automatically from single 2D images of free-form revolution objects. The size of the 3D models may be relatively small, and thus a large amount of 3D models may be efficiently stored. In some examples, the size of the 3D models may be several orders of magnitude smaller than 3D models generated by other methods. For example, each 3D model may be defined by sets of equations that can be used to generate 3D meshes with varying resolution and tessellation. In some examples, the 3D model may be used efficiently to create mesh models for a variety of applications, including 3D printing, virtual reality, augmented reality, robotics, computer automated design (CAD) and product, etc. The techniques described herein thus enable efficient generation of 3D meshes of various resolutions. For example, a mesh of any resolution and amount of tessellation can be generated based on the 3D model, a resolution parameter, and a tessellation parameter.

In addition, the techniques described herein may be agnostic to the data source of images. For example, the techniques may be compatible with images received from cameras or databases. Therefore, the techniques may work seamlessly with existing online repositories of image collections or images from digitization-stations.

In addition, the present techniques do not require training stages nor annotated data sets to create shape vocabularies or inflation regions. Moreover, because the synthesis stage described below is solely based on shape invariants and texture information from a single image, there is no need for underlying statistical inference or structural completion. Thus, the present techniques may work well with applications having tight connectivity and limited computation, including mobile devices, smart phones, and wearable devices.

FIG. 1 is a block diagram illustrating an example system for generating three dimensional (3D) models based on single two dimensional (2D) images. The example system is referred to generally by the reference number 100 and can be implemented in the image processor 1126 of the computing device 1100 below in FIG. 11. For example, the example system 100 can be implemented at least in part using the image processor 1126 of the computing device 1100 below.

The example system 100 includes web repository 102 to provide one or more compressed 2D images 104 of objects to be modeled in three dimensions. For example, the objects may be free-form revolution objects. In some examples, the system 100 can include a camera 106 to provide 2D images 108 of objects. In some examples, the images 108 from the camera 106 may also be compressed. In some examples, the images 108 from the camera 106 may be raw, or uncompressed, images 108. In some examples, the camera 106 can be aligned with the object to produce the images 108 from a predetermined perspective. The system 100 further includes a number of processing components, including receiver, validator, and scaler 110 communicatively coupled to the web repository 102 and the camera 104. For example, the receiver, validator, and scaler 110 may receive the images 104, 108 and output regions of interest 112. The system 100 further includes a segment extractor 114 communicatively coupled to the receiver, validator, and scaler 110. For example, the segment extractor 114 can receive regions of interest 112 and extract binary segments 116, textured segments 118, and segment characterizations 120. The system 100 further includes a contour generator 122 communicatively coupled to the segment extractor 114 and a skeleton cue extractor 124. The skeleton cue extractor 124 may also be communicatively coupled to the segment extractor 114. The skeleton cue extractor 124 may receive segment characterizations 120 and extract regression cues 126 and skeleton cues 128 including an axis of rotation. The contour generator 122 may receive binary segments 116 and regression cues 126, and output contours 130. In some examples, the contours may be unlimited-resolution contours 130. For example, the contours may be functions that can be used to generate a 3D model at any resolution. The system 100 also includes a 3D model generator 132 communicatively coupled to both the contour generator 122 and the skeleton cue extractor 120. For example, the 3D model generator 132 may receive textured segments 118, contours 130, and skeleton cues 128, and output 3D models 134 and textured meshes 136. The final product may be a 3D model 138. For example, the 3D model may be a loselessly compressed 3D model 138. In some examples, the 3D model 138 may have an unlimited resolution that may be used to generate meshes of any resolution.

As shown in FIG. 1, the receiver, validator, and scaler 110 can receive one or more 2D images 104, 108 from the web repository 102 or the camera 106, respectively. In some examples, the web repository 102 may store a number of a 2D images 104 of various objects to that may have one or more structural invariants. For example, the objects may include free-form revolution objects. In some examples, the objects may have a main axis partially aligned to the camera frame. In some examples, images 108 captured using a camera 106 may also have background subtraction applied prior to being received by the receiver, validator, and scaler 110. Thus, existing online repositories of image 104 collections or images from digitization-stations may work seamlessly with the techniques described herein because the present techniques are agnostic to the data source.

The receiver, validator, and scaler 110 can perform pre-processing on the received image 104, 108. For example, the receiver, validator, and scaler 110 can perform detection of image compression, content validation, and spatial scaling. In some examples, the receiver, validator, and scaler 110 can detect a region of interest (ROI) 112 in a received image and a compression ratio to automatically adjust parameter boundaries for subsequent adaptive algorithms. The region of interest 112 may be a rectangular region of an image representing an object to be modeled. In some examples, the object to be modeled can be determined based on pixel color. For example, the region of interest may be a rectangular region including pixels that have a different color than a background color. In some examples, at least one of the pixels of the object to be modeled may touch each edge of the edge of the region of interest. In some examples, the receiver, validator, and scaler 110 can validate the region of interest. For example, the receiver, validator, and scaler 110 can compare a detected region of interest with the corresponding image including the region of interest. In some examples, if the region of interest is the same as the corresponding image, then the image may be rejected. In some examples, if the region of interest is not the same as the corresponding image, then the region of interest may be further processed as described below. The receiver, validator, and scaler 110 can then add a spatial-convolutional margin to the ROI 112. For example, the spatial-convolutional margin can be a margin of pixels that can be used during filtering of the region of interest. For example, the spatial-convolutional margin may be a margin of 5-7 pixels that can be used by the filter to prevent damage to content in the region of interest. The receiver, validator, and scaler 110 may then scale the ROI 112 to increase the resolution of the region of interest. For example, the receiver, validator, and scaler 110 can scale content of the ROI 112 by a factor of 2× using bi-cubic interpolation to increase saliency representative and discrete-contour precision. The scaling may be used to improve the quality of the filtering process.

The segment extractor 114 can receive the validated and scaled ROIs 112 and generate one or more binary segments 116, textured segments 118, and segment characterizations 120 based on the validated and scaled ROIs 112. For example, the segment extractor 114 can extract a binary segment representing the shape of an object from a raw image 108. For example, the binary segment may be a two-dimensional shape corresponding to the object's 2D projection on an image plane. The binary segment may have attributes such as a center of mass, bounding box, total pixels, principal axes, and a binary mask. In some examples, the binary mask may be applied to a source color image to generate a texture image as described below. In some examples, the segment extractor 114 may also include adaptive filters and graph-based segmentation that can be used to prevent and solve problems caused by image compression artifacts and unpropitious lighting and material combinations. The segment extractor 114 can thus perform fast and fully automatic removal of compression artifacts. In some examples, the segment extractor 114 can also perform speckle removal by adaptive rejection of pixels using their 8-connectivity degree in a recursive fashion. In some examples, the speckle removal can be further refined by smoothing expansion and contraction. The processing performed by the segment extractor 114 may generally be referred to herein as a signal phase. Because the signal phase may be the foundation for all subsequent phases, the segment extractor 114 may thus include high quality smoothing and acutance-preserving contouring. The operation of the segment extractor 114 is described in detail with respect to the example segment extractor of FIG. 2 below. The final output of the segment extractor may be a binary segment 116, a textured segment 118, and a binary segment with segment characterization 120.

The contour generator 122 can then receive a binary segment 116 from the segment extractor 114 and generate a contour 130 based on the binary segment 116. The processes performed by the contour generator 116 may also be generally referred to herein as a contour phase. For example, the contour generator 122 can transform a binary segment 116 received from the segment extractor 114 into a closed-contour function 130. In some examples, the closed-contour function may be a continuous derivable function, also referred to herein as an unlimited-resolution contour 130, composed of a collection of piece-wise function segments exposing a real density domain. For example, the piece-wise function segments may be kernel-blended local radial polynomials. In some examples, the function segments may be blended at the overlapping regions using kernel blending. In some examples, function segments can include attributes such as local center, angular oriented scope, coefficients, root mean square, and maximal absolute deviations. In some examples, the contour generator 122 can obtain parameter-free segmentation of contour segments based on their implicit curvature in terms of eccentricity. The contour generator 122 can then detect a particular degree and coefficients for a radial polynomial while extracting the radial polynomial that tightly fits the contour points using a weighted regression to integrate all saliency cues. In some examples, the particular degree and coefficients can be determined by selecting a degree that minimizes the fitting error. Thus, 10 polynomials may be obtained from the regression and evaluated to keep the best fit as the resulting function. The contour generator 122 may thus enable precise and efficient synthesis of surfaces. For example, the contour 130 may be a function that can be evaluated at any resolution while providing a normal vector at all points. The processes in the contour phase can generate an optimal piece-wise radial polynomial function arrangement describing the object's contour 130. The generated unlimited-resolution contour 130 may be formulated as a linked collection of blending radial polynomial nodes. For example, the contour generator 122 may create a graph of smooth and highly representative 2D continuous shape primitives. An example operation of the contour generator 122 is described in greater detail with respect to the example contour generator of FIG. 4 below.

The skeleton cue extractor 124 may receive binary segments and segment characterizations 120 from the segment extractor 114. The processes performed by the skeleton cue extractor 124 may also be referred to as structural phase. In some examples, the contour generator 122 and the skeleton cue extractor 124 may receive the binary segments from the segment extractor 112 simultaneously. The skeleton cue extractor 124 can generate a MAT graph based on the binary segment and extract one or more cues. For example, the skeleton cue extractor 124 can transform the binary segment received from the signal phase into a pixel-wise approximation of a medial-axis-transform (MAT) represented as a graph by means of adaptive convolution filtering. In some examples, the MAT graph may be generated using an efficient computation of a MAT approximation. For example, the MAT approximation may be performed using a phase-shifting saliency filter from the distance transformation. Due to its pixel-wise computation and geometric approximation, this efficient filter may enable much faster single thread CPU run-times. The MAT graph may be used as a representation for the extraction of both topological cues and structural cues. For example, topological cues can include loops in a skeleton showing if a shape has holes or not. In some examples, structural cues may include line segments of the skeleton showing the presence of an axis of rotation. In some examples, line segments selected as axis of rotation candidates can be verified by checking alignment with the main axes of the binary segment. The skeleton cue extractor 124 may then output skeleton cues 128 including one or more line segments verified as axes of rotation. In some examples, the skeleton cue extractor 124 may extract regression cues 126. For example, the regression cues 126 may be leaf-nodes from the MAT graph that can be used as cues for contour regression then used as radial polynomial centers because of their regular distance to the contour. An example operation of the skeleton cue extractor 124 is described in greater detail with respect to the example skeleton cue extractor of FIG. 6. As described in greater detail in the structural phase, the skeleton cue extractor 124 may analyze the inner morphology of the object's blob through a pixel-wise approximation of the MAT. For example, the blob may be a collection of pixels that conform to an immutable object and provides methods and properties to manipulate the object's binary data. The result may be a collection of geometric primitives or cues from the blob's skeleton. In some examples, these cues can then be used to determine and validate the existence and orientation of an axis of rotation. As used herein, an axis of rotation refers to an axis in a plane about which a contour may be revolved to form a 3D model. In some examples, the endpoints of the MAT graphs and line-segments may also be used by the contour generator 122 during a regression to fit shape primitives in the contour phase. These endpoints are also referred to herein as leaf-nodes. In some example, the endpoints may be used during a regression stage while obtaining the contour radial polynomial functions.

The 3D model generator 132 may receive a contour 130 from the contour generator 116 and a skeleton cue 128 from the skeleton cue extractor 120 and generate a 3D model 138 based on the contour and the skeleton cue. The processes performed by the 3D model generator 132 may also be referred to herein as the synthesis phase. In the synthesis phase, the 3D model generator 132 can integrate the unlimited-resolution contour 130, the skeleton cues 128 including an axis of rotation, and the textured segment 118 to generate an explicit 3D mesh model through a geometric tensor product. For example, the 3D model generator 132 may process the contour 130 and the skeleton cue 128 according to a tensor-based synthesis as described with respect to the example 3D model generator of FIG. 8 below.

In some examples, the 3D model generator 132 can then generate one or more meshes 136 based on the 3D model. For example, the 3D model generator 132 can generate a mesh based on the 3D model and a resolution parameter. For example, the resolution parameter may specify a particular resolution for the generated mesh 136. In some examples, serialization of the resulting implicit unlimited-resolution 3D model 134 and a texture image 136 into a loss-less compression representation 138 may enable cloud computing applications to operate with large numbers of object models.

The diagram of FIG. 1 is not intended to indicate that the example system 100 is to include all of the components shown in FIG. 1. Rather, the example system 100 can be implemented using fewer or additional components not illustrated in FIG. 1 (e.g., additional image sources, processing components, etc.).

Figure 2:
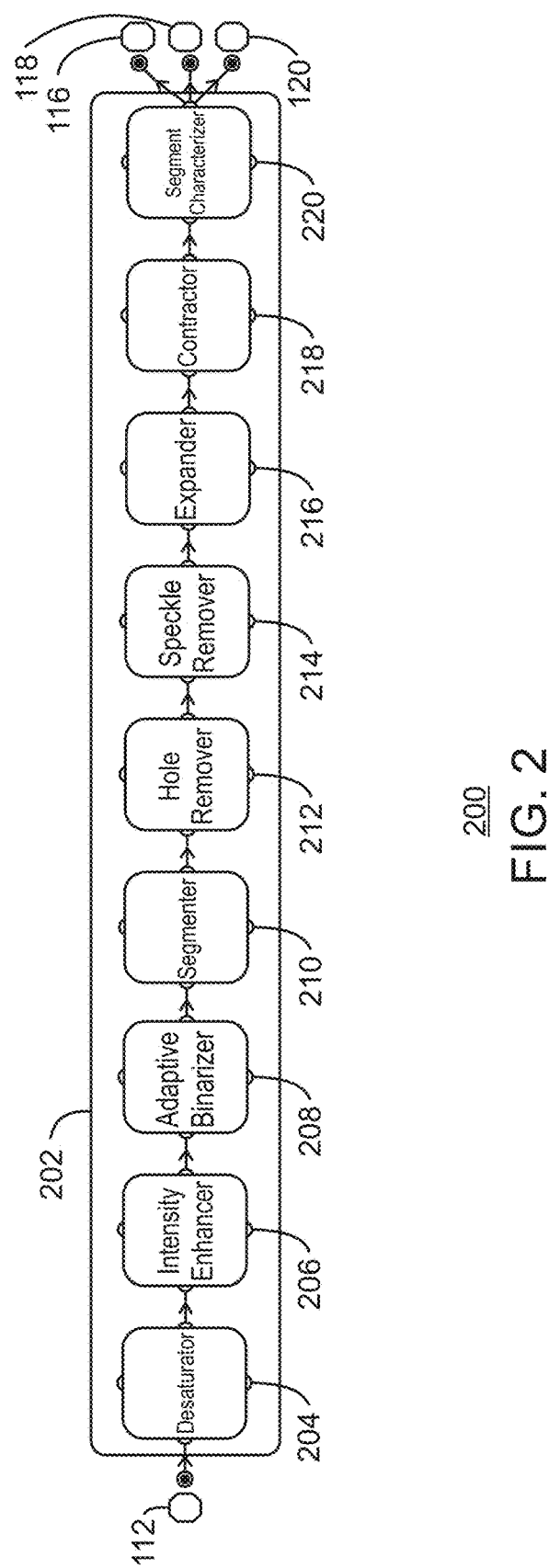
FIG. 2 is a detailed block diagram illustrating an example system that can extract binary segments.

FIG. 2 is a detailed block diagram illustrating an example system that can extract binary segments. The example system is referred to generally by the reference number 200 and can be implemented in the system 100 above or the image processor 1126 of the computing device 1100 below in FIG. 11. The processing performed by the example segment extractor 202 of system 200 may also referred to herein as a signal phase.

The example segment extractor 202 is shown receiving a region of interest (ROI) 112 at a desaturator 204 included in the segment extractor 202. The segment extractor 202 further includes a number of additional processing components, including an intensity enhancer 206, an adaptive binarizer 208, a segmenter 210, a hole remover 212, a speckle remover 214, an expander 216, a contractor 218, and a segment characterizer 220, communicatively coupled to each other, in that order. The segment extractor 202 is shown outputting a binary segment 116, a textured segment 118, and a segment characterization 120.

As shown in FIG. 2, the segment extractor 202 can receive an ROI 112. For example, the ROI may have been detected in a received 2D image of an object. The desaturator 204 may then desaturate the ROI 112. For example, the desaturator can reduce a color image to an intensity image. In some examples, the desaturator can reduce the color image to the intensity image using a function to extract the minimal or maximal RGB-channel maximizing the difference to the image background.

The intensity enhancer 206 can improve image intensity of the ROI 112. In some examples, the intensity enhancer 206 can improve image intensity by adjusting a brightness, contrast, and gamma of the image. The improved image intensity may be used to prepare the image for subsequent adaptive binarization at the adaptive binarizer 208.

The adaptive binarizer 208 can assign pixel intensity via an adaptive binarization function. For example, the adaptive binarizer 208 can use rank filtering with spatial bandwidth to address subtle gradients. The result may be a binary image.

The segmenter 210 can perform segmentation on the region of interest via binary region growing. For example, the segmenter 210 can detect separate connected groups of pixels, or blobs, and may color each blob a different color. In some examples, bounding box coordinates may be stored while extracting the binary segments.

The hole remover 212 can remove holes from the binary segments. For example, the hole remover 212 can sort the binary segments based on bounding box size and relative embedding to obtain a largest container segment. The hole remover 212 can then integrate sub-segments to remove holes from the largest container segment. In some examples, the hole remover 212 can discard disjointed segments while creating a binary mask image.

The speckle remover 214 can remove speckle pixels from the binary mask image. In some examples, the speckle remover 214 can remove speckle pixels using an erosion process. For example, the speckle pixels may be spurious contour artifacts from image compression. In the binary mask image, speckle pixels may significantly differentiate when observing their connectivity degree. In some examples, speckle remover 214 can use an ordered iterative rejection of pixels with a lower connectivity degree to remove all speckles, while fully preserving contour acutance. Contour acutance, as used herein, refers to subjective perception of sharpness that is related to the edge contrast of a contour.

The expander 216 can expand the speckle-less binary mask image. For example, the expander 216 can diffuse the contour using a subtle smoothing. For example, this diffusion of the contour may improve contour regression performed by the contour generator as described in FIG. 4 below.

The contractor 218 can contract the expanded binary mask image. For example, the contractor 218 can contract the diffused contour to generate a binary image by a non-adaptive binarization. In some examples, the binary segment 116 can then be updated using the binary image. The binary image can also be used to generate a texture map and a textured segment 118. For example, the texture map may be used to map the textured segment 118 to a contour surface in the synthesis phase described below.

The segment characterizer 220 can characterize the binary segments 116. For example, the segment characterizer 220 can analyze the binary segment 116 and obtain a center of mass and canonical axes from its Eigenvalues and Eigenvectors. The segment characterizations 120 can be output to a skeleton cue extractor as described in FIG. 1 above and FIG. 6 below.

Figure 3:
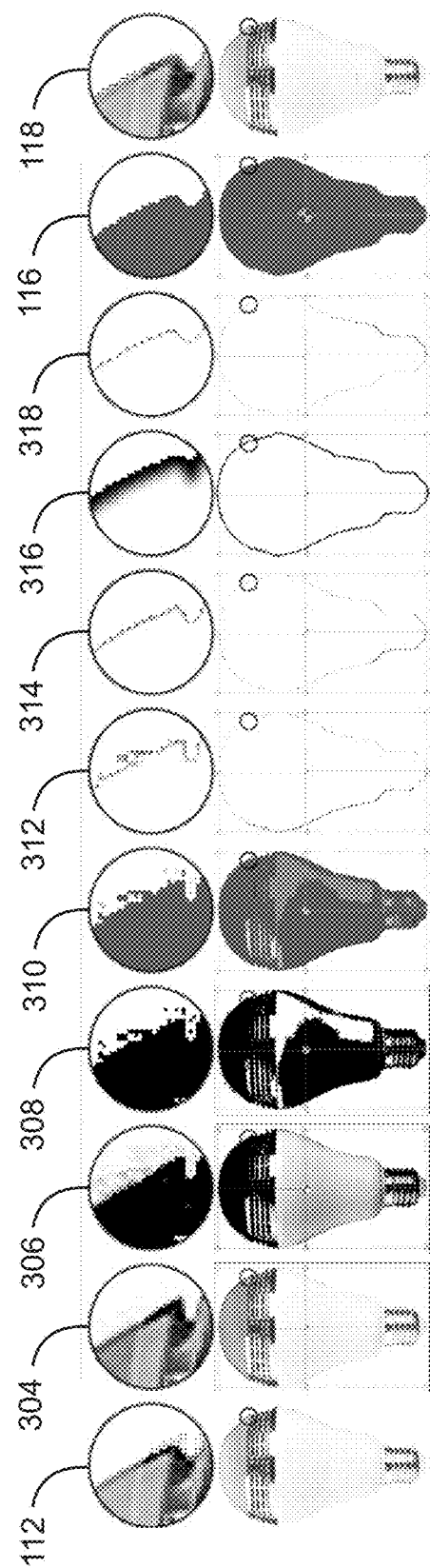
FIG. 3 is an example region of interest (ROI) being processed by the segment extractor of FIG. 2.

Thus, the segment extractor 202 may receive a compressed and noisy input image 112 of an object and extract a binary segment 116 corresponding to the object without compression noise or speckles as shown in the example of FIG. 3 below.

The diagram of FIG. 2 is not intended to indicate that the example segment extractor 202 is to include all of the components shown in FIG. 2. Rather, the example segment extractor 202 can be implemented using fewer or additional components not illustrated in FIG. 2 (e.g., additional inputs, processing components, outputs, etc.). Furthermore, although shown in a particular order, in some examples, the components 204-220 may also be arranged in different orders.

FIG. 3 is an example region of interest (ROI) being processed by the segment extractor of FIG. 2. The example process is generally referred to using the reference number 300 and can be performed using the segment extractor of FIG. 2 above.

In FIG. 3, an ROI 112 is received. For example, the ROI may be a region corresponding to a light bulb identified in a 2D color image. The ROI 112 may then be desaturated by a desaturator to produce a grayscale image, or desaturated ROI 304. An intensity enhancer may then improve image intensity of the desaturated ROI 304 to generate an intensity enhanced ROI 306. An adaptive binarization may then be applied to the intensity enhanced ROI 306 to generate a binary image 308. For example, the adaptive binarization may remove gradients and result in an image of black and white pixels. A segmentation can then be applied to the binary image 308 by a segmenter to extract a binary segment 310. Hole removal may then be performed by a hole remover on the extract binary segments 310 to generate a binary mask image 312. Speckle removal may then be performed by a speckle remover on the binary mask image 312 to generate a speckle-less binary mask image 314. For example, the speckle remover may remove spurious contour artifacts that may have resulted from image compression. An expander may then apply diffusion on the speckle-less binary mask image 314 to generate a diffused binary mask image 316. A contraction may then apply a non-adaptive binarization on the diffused binary mask image 316 to generate a binary image 318. The binary image 318 may be used to generate a binary segment 116 and a textured segment 118. For example, the binary segment 116 may be generated as described above with respect to FIG. 1. In some examples, the texture image 118 can be generated by applying the binary mask 216 to the source image to select pixels from the source image masked by the binary mask 216.

Figure 4:
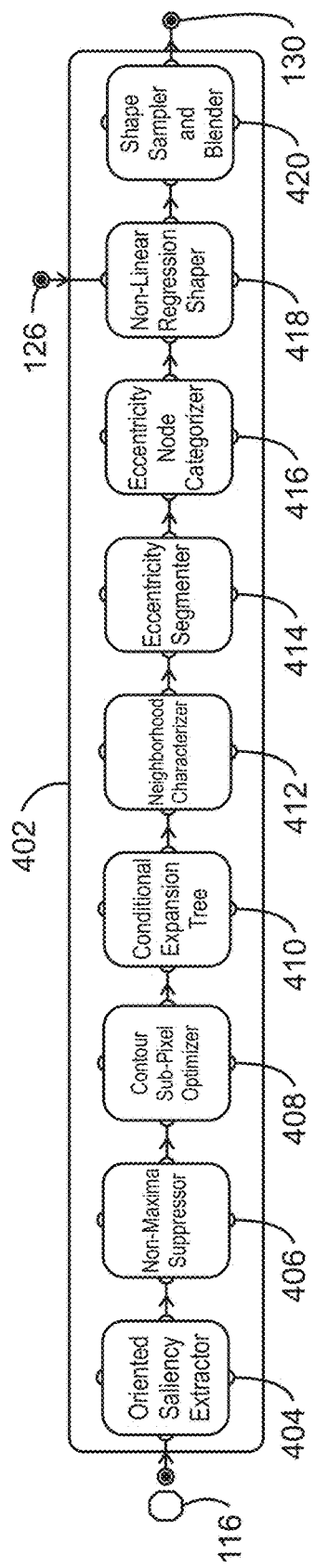
FIG. 4 is a detailed block diagram illustrating an example system that can generate contours.

FIG. 4 is a detailed block diagram illustrating an example system that can generate contours. The example system is referred to generally by the reference number 400 and can be implemented in the system 100 above or the image processor 1126 of the computing device 1100 below in FIG. 11. The processing performed by the example contour generator 402 of system 400 may also referred to herein as a contour phase.

The example contour generator 402 is shown receiving binary segment 116 at an oriented saliency extractor 404 of the contour generator 402. For example, the binary segment 116 may have been generated by the segment extractor. The contour generator 402 further includes additional processing components, including an non-maxima suppressor 406, an contour sub-pixel optimizer 408, a conditional expansion tree 410, a neighborhood characterizer 412, a eccentricity categorizer 414, an eccentricity node categorizer 416, a non-linear regression shaper 418, and a shape sampler and blender 420, communicatively coupled to each other, in that order. The contour generator 402 is also shown outputting a contour 130.

As shown in FIG. 4, the contour generator 402 may receive a binary segment 116 at the oriented saliency extractor 404. The oriented saliency extractor 404 can perform a saliency extraction on the binary segment 116. For example, the oriented saliency extractor 404 can compute an oriented Gabor saliency function by convolution with a set of orientation-complementary Gabor kernels. Each kernel can extract a directional band using the equation:

$$\Psi(x, \alpha, \gamma_1, \gamma_2, \lambda) = \exp\left[-\frac{1}{2}x^T \sum^{-1} x\right] \sin\left[\pi \frac{U\langle\alpha\rangle \cdot x}{\lambda}\right] \quad \text{Eq. 1}$$

where x denotes a pixel location where a pixel is being filtered, α denotes the angle of orientation of the filter, γ1 and γ2 denote Eigen values of the covariance matrix described by large SIGMA, λ denotes the derivation scaling factor that controls the amount of smoothness versus gradient detection, and T denotes the transpose. In some examples, the whole saliency extraction may be formally expressed using the equation:

$$\Gamma(x) = \sum_{p=1}^{k} \sum_{q=0}^{1} U\langle p\pi/2k\rangle\left\{N(x)\circledast \Psi\left(x, p\pi/2k + \frac{q\pi}{2}\gamma_1, \gamma_2, \lambda\right)\right\} \quad \text{Eq. 2}$$

where ⊛ denotes a discrete convolution operator, p denotes a particular orientation of a filter, k denotes the total amount of orientation complementary filters, and q is an auxiliary variable.

The non-maxima suppressor 406 can change the oriented saliency image into a set of pixel points along the edges or rim of the oriented Gabor saliency function. The non-maxima suppressor 406 may thus remove non-maxima points. The resulting image may be a collection of pixels forming a discrete contour of an object. For example, on a saliency orientation, a pixel location may have two neighbors with its 8-neighborhood defined using the equation:

$$\tilde{x}_{\pm} = x \pm [\eta(\vec{\Gamma} x), \hat{i}), \eta(\vec{\Gamma} x)\hat{j})]^T \quad \text{Eq. 3}$$

where the function:

$$\eta : (\mathbb{R}^2, \mathbb{R}^2) \mapsto \{-1, 0, 1\} \quad \text{Eq. 4}$$

can be used to determine the discrete increment along the unitary axes $\hat{i}$ and $\hat{j}$. In some examples, the dual contour non-maximum suppressor 406 can select pixels close to the continuous contour considering saliency norm and coherency. A similar process may be used for skeleton extraction in the structural phase as discussed with respect to FIG. 6 below.

The contour sub-pixel optimizer 408 can perform contour sub-pixel optimization on the discrete contour. For example, due to the non-maxima suppression, every pixel on the binary map may be located at most √2 units away from the local maximum contour. In some examples, the contour sub-pixel optimizer 408 can refine the discrete location of each pixel to its sub-pixel counterpart gradient ascent along a Gabor saliency in order to reach the local maximum contour.

The conditional expansion tree 410 can be used to perform conditional graph expansion. For example, using the right data structure for pixel lattice representation, the conditional expansion tree 410 can be used to exploit the discrete pixel grid for a conditional graph expansion. In the resulting graph, nodes can be points along the contour and non-redundant links can be the contour line. A node linkage can be established by minimizing the sub-pixel distances. For example, the node linkage may be established by minimizing the sub-pixel distances using the equation:

$$\delta_{(i,j)} = |\tilde{x}_i - \tilde{x}_j| \quad \text{Eq. 5}$$

In this manner, the contour can be correctly captured by the graph incidence with high reliability. In some examples, the contour-graph extraction can proceed with traversal prioritization driven by inverse sorting of sub-pixel distances. A contour may thus be generated by a tree expansion. The characterization gives attributes to each element in this contour to be later on segmented according to attributes.

The neighborhood characterizer 412 can generate attributes for each of the contour segments. For example, the contour segments can be segmented according these attributes. In some examples, one attribute may be eccentricity. For example, the eccentricity attribute can help to separate contour blocks or segments according to their eccentricity. In this way, the contour segments may have common curvature and may be easily represented like segments by radial polynomials in a local manner. In some examples, this connection may be used to determine the overlapping regions when sliding away from one segment to the next while tessellation takes place. In some examples, neighborhood characterizer 412 can perform a contour arc-length regularization. By connecting contour segments, the whole contour 130 can be managed as a unitary parametric function regardless of the specific local blending of radial polynomial functions.

The eccentricity segmenter 414 can segment contour points into categories according to eccentricity. For example, the contour points can be segmented into five categories based on the eccentricity values generated by the neighborhood characterizer 412. In some examples, the eccentricity segmenter 414 can split regions along the contour within the same curvature category in a noise tolerant manner by splitting contour points into categories according to eccentricity.

The eccentricity node categorizer 416 can locally characterize a contour graph based on the eccentricity of the nodes. For example, the eccentricity node categorizer 416 may characterize the graph by computing the covariance matrix for every single node along the contour-graph using the inverse weighting of the graph distance. In some examples, an eccentricity model can be generated based on the covariance matrix. For example, the eccentricity model ξ can be generated using the equation:

$$\xi(\tilde{x}_i) = \kappa \left[ \frac{2}{\pi} \arctan\left( v \frac{\sigma^1}{\sigma^2} \right) - \frac{1}{2} \right] \qquad \text{Eq. 6}$$

where $\sigma_1$ and $\sigma_2$ are Eigenvalues of the $\tilde{x}_i$-centered covariance matrix.

The non-linear regression shaper 418 can extract shapes from the contour graph using radial polynomial regression. For example, local shape descriptors can be extracted from the contour segments in terms of radial polynomials by weighted least-square regression in the radial domain. In some examples, the non-linear regression shaper 418 can obtain a selection of a radial polynomial center point from the leaf nodes of the MAT graph. For example, the leaf nodes may have been received as part of the regression cues 126 from the skeleton cue extractor. In some examples, the non-linear regression shaper 418 can locate the function center within the bounding circle of a contour segment based on the fitting score of the polynomial. In some examples, the non-linear regression shaper 418 can also optimize the selected center subject to global root mean square (RMS) and maximal absolute deviation (MAD). In some examples, the saliency magnitude of each point can be used as a weighting factor in weighting least square fitting. In this manner, the non-linear regression shaper 418 can use contour points with stronger saliency to draw the polynomial to a better fitting score. In some examples, the non-linear regression shaper 418 can ensure a segment's overlapping is addressed by including n≥2 points from neighbor segments guaranteeing connectivity of a degree n−1.

The shaper sampler and blender 420 can sample the continuous contour. For example, shaper sampler and blender 420 can sample the continuous contour for explicit mesh tessellation. In some examples, the sampling can be driven by a desired target resolution. Evaluation of the contour points within overlapping regions can be performed by using a kernel weighted combination of radial polynomials.

The diagram of FIG. 4 is not intended to indicate that the example contour generator 402 is to include all of the components shown in FIG. 4. Rather, the example contour generator 402 can be implemented using fewer or additional components not illustrated in FIG. 4 (e.g., additional inputs, processing components, outputs, etc.). Furthermore, although shown in a particular order, in some examples, the components 404-420 may also be arranged in different orders.

Figure 5:
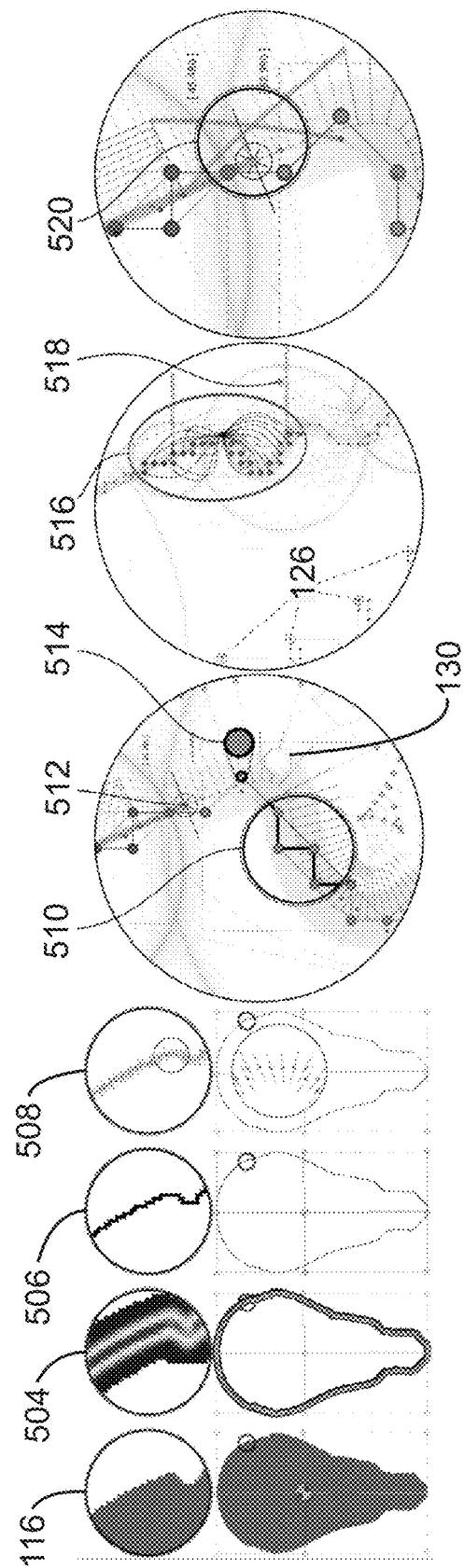
FIG. 5 is an example binary segment being processed by the contour generator of FIG. 4.

FIG. 5 is an example binary segment being processed by the contour generator of FIG. 4. The example process may generally be referred to by the reference number 500 and can be performed using the contour generator 402 of FIG. 4.

In FIG. 5, a binary segment 116 may be received for processing. For example, the binary segment 116 may have been generated by the segment extractor 114 of FIG. 1. A saliency extraction can be performed on the binary segment 116 to generate a discrete contour 504. The discrete contour 504 may then have a dual non-maximum suppression performed thereon to generate a discrete edge 506. A contour sub-pixel optimization may then be performed on the pixels of the discrete edge 506 to generate an oriented gradient 508. For example, each pixel of the oriented gradient 508 may have an orientation including a magnitude and an angle. The oriented gradient 508 can then have conditional graph expansion performed thereon to produce contour segments 510. A neighborhood characterization may then be performed on the contour segments 510 to connect the contour segments 510 on both extremes with neighboring nodes as shown in 512. Contour points in the contour 130 may then be split into categories according to eccentricity as shown in 514. An eccentric node categorization 516 may then be performed by calculating a covariance matrix centered at a particular point to locally characterize the contour 130 based on the eccentricity of the nodes. For example, the eccentricity may refer to the ratio of the length axis to the width axis of the ellipse 516. In some examples, the connectivity of the points along the contour can be used to generate a covariance matrix centered at each point. In some examples, a corner may be differentiated from a line or a transition using the covariance matrix because the associated covariances may be ellipses with very different ratios about their axes. For example, a point along a line may have an ellipse with a very large and a very short axis, while a corner point has a covariance with an implicit ellipse having almost equal axes. In some examples, the eccentricity may be used to separate points along the contour in such a way that their shapes are similar. For example, segments with similar eccentricity points along the contour can enable the contour to include curves of similar curvature, thus the resulting radial polynomial may be similar along this segment of the contour 130 and thus the regression may be ideal, stable and precise. In some examples, points with similar shapes may be categorized into categories. The contour 130 may then be shaped by non-linear regression 518 based on a set of regression cues 126. For example, the regression cues 126 may have been generated by the skeleton cue extractor 124 of FIG. 1 above. The contour 130 may then further be shaped, sampled, and blended 520. For example, the contour 130 can be sampled for explicit mesh tessellation. In some examples, the contour 130 may then be converted into a set of polynomial functions. For example, curves within the contour 130 may be represented using coefficients of polynomials. In some examples, the contour 130 may be arranged into families of functions that together represent the contour 130. In some examples, overlapping functions may blended together using kernel blending. Thus, at any point in the contour 130 a local function may be used to generate a first derivative or second derivative value.

Figure 6:
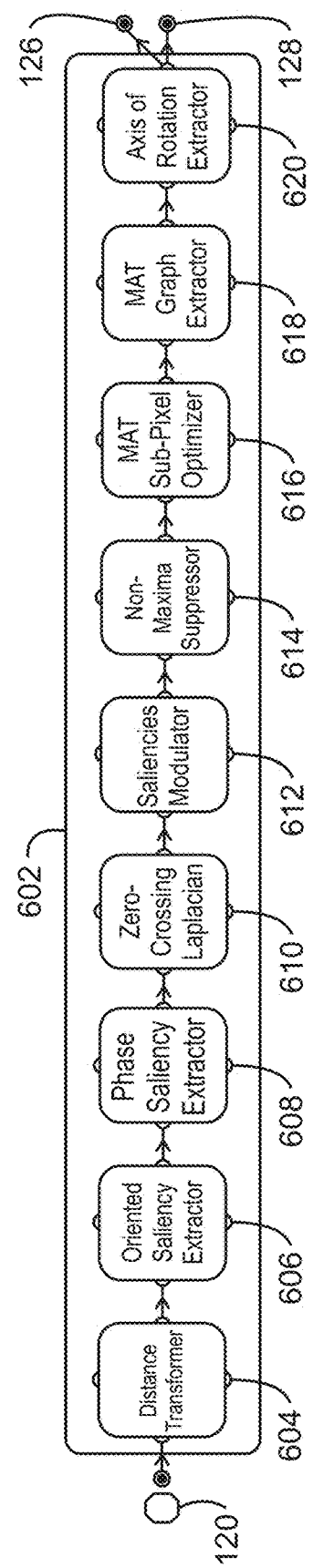
FIG. 6 is a detailed block diagram illustrating an example system that can generate MAT graphs and extract skeleton cues.

FIG. 6 is a detailed block diagram illustrating an example system that can generate MAT graphs and extract skeleton cues. The example system is referred to generally by the reference number 600 and can be implemented in the system 100 above or the image processor 1126 of the computing device 1100 below in FIG. 11. The processing performed by the example skeleton cue extractor 602 of system 600 may also referred to herein as a structural phase.

The distance transformer 604 can receive a binary segment and segment characterization 120 and generate a boundary distance map. For example, the boundary distance map may be a map of distances to the boundaries of the binary segment. For example, the boundary distance map may be an image having pixels with values indicated how far each pixel is from the border. In some examples, the maxima of this image may be the rim or the implicit outer skeleton. In some examples, the boundary distance map can use an 8-connectivity graph. The contour pixels from the function N(x) can be the zero value of the distance function. In some examples, all pixels connected to the contour may be used to perform a tree horizontal expansion while verifying the minimal distance at each pixel. For example, the distance transformation saliency extraction may be performed using Equation 2 above.

An oriented saliency extractor 606 can perform oriented saliency extraction on the distance transformation image. For example, the oriented saliency extraction may use similar processes described with respect to the oriented saliency extractor of FIG. 4 above. However, the particular parameters of the Gabor filters may be different. The oriented saliency extraction may result in a generated oriented saliency image with pixels of magnitude and orientation.

A phase saliency extractor 608 can perform phase saliency extraction on the oriented saliency image. For example, the phase saliency extraction function $\Theta: (x \in N^2) \rightarrow N$ can be expressed using the equation:

$$\Theta p(x) = \Sigma_{y \in \Delta} \Omega(|x-y|) \cdot [-\hat{\Gamma}(x) \cdot \hat{\Gamma}(y)]^{(2p+1)} \qquad \text{Eq. 7}$$

where $p \in N+$ is the odd power saliency, $\Delta$ is the pixel neighborhood set and $\Omega(|x-y|)$ is a distance weighting kernel. The phase saliency can emphasize pixels at the border of the phase shifting. For example, the phase saliency can emphasize the rim of the distance transformation.

A zero-crossing Laplacian 610 can be used to increase the acutance of a phase filtering stage. For example, the zero-crossing Laplacian 610 can be used to detect the maximum even at small magnitudes while improving the overall saliency of a previous phase saliency extractor in Eq. 7. For example, the Laplacian filtering and point-wise modulation can improve the saliency separability for the non-maximum suppression.

A saliencies modulator 612 can be used to perform modulation on the zero-crossing Laplacian image. For example, the saliencies modulator 612 can multiply the zero-crossing Laplacian again with the region of saliency to remove spurious skeletal segments. In some examples, the saliencies modulator 612 may multiple the zero-crossing Laplacian 2 times or four times.

A non-maxima suppressor 614 can select pixels close to edges of the modulated image considering saliency norm and coherency. For example, the non-maxima suppressor 614 may perform similar processing as described for the non-maxima suppressor of FIG. 4 above to generate a discrete skeleton.

A MAT sub-pixel optimizer 616 can refine the discrete location of each pixel of the MAT to its sub-pixel counterpart gradient ascent along a Gabor saliency in order to reach the local maximum contour. For example, the MAT sub-pixel optimizer 616 may perform the similar processing as described for the contour sub-pixel optimizer of FIG. 4 above.

A MAT graph extractor 618 can extract a MAT graph from the optimized segment using a pixel-wise approximation of MAT. For example, the skeleton structure includes both the contour and the inner skeleton. However, the outer contour may be a rough approximation.

An axis of rotation extractor 620 can extract line-segments and an axis of rotation from the extracted MAT graph. In some examples, the skeleton cue extractor can then determine whether the object is a free-form revolution object. For example, if the skeleton cue extractor detects that the object is a free-form revolution object based on the extracted line segments and axis of rotation, then a 3D model may be generated based on the axis of rotation. If the skeleton cue extractor detects that the line segments do not line up with the axis of rotation, then a 3D model may not be generated and an error may be returned.

As shown in FIG. 6, the processes in the structural phase can validate and extract the line segments from the MAT corresponding to the object's axis of rotation. For example, if an axis of rotation of the binary segment is aligned with a large line segment in the MAT, then a revolution surface can be asserted. If the line segments are not collinear to the axis of rotation, then they are not valid for rotation and may be disregarded. In some examples, the line segments may be validated by superimposing the axis of rotation of the binary segment 120 with line segments from skeleton 718, 720 to determine if any overlap exists. For example, if both segments are collinear and parallel, then the existence of a rotation shape may be validated. Otherwise, the input image may be rejected and process is stopped. Because a free-form revolution object may lead to a complex MAT, there may be various candidate line segments from the MAT to be aligned with the axis of rotation of the binary segment. In addition, the running time for extracting the MAT using standard libraries may be time prohibitive and take on the order of minutes per image. In some examples, an approximation of the MAT may be used in order to speed up the MAT computation. In some examples, the MAT approximation may include processes described in the contour extraction discussed above in FIG. 4. For example, the values of the filters and parameters may differ.

The diagram of FIG. 6 is not intended to indicate that the example skeleton cue extractor 602 is to include all of the components shown in FIG. 6. Rather, the example skeleton cue extractor 602 can be implemented using fewer or additional components not illustrated in FIG. 6 (e.g., additional inputs, processing components, outputs, etc.). Furthermore, although shown in a particular order, in some examples, the components 604-620 may also be arranged in different orders.

Figure 7:
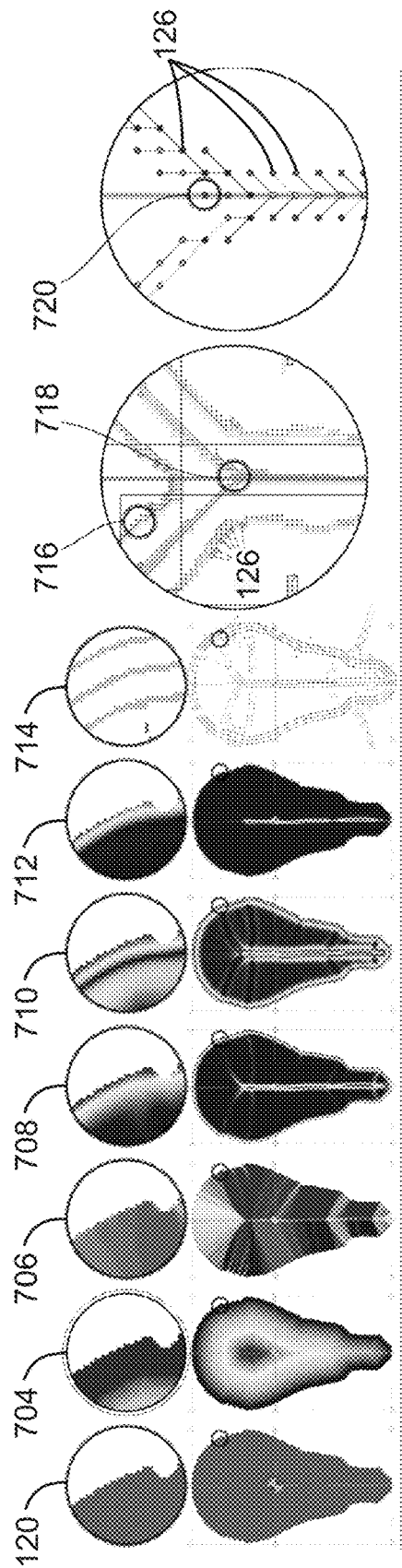
FIG. 7 is an example binary segment being processed by the skeleton cue extractor of FIG. 6.

FIG. 7 is an example binary segment being processed by the skeleton cue extractor of FIG. 6. The example process may generally be referred to by the reference number 500 and can be performed using the skeleton cue extractor 602 of FIG. 6.

In FIG. 7, a binary segment and segment characterization 120 may be received. For example, the binary segment and segment characterization 120 may have been generated by the segment extractor 114. A distance transformation can be applied to the binary segment 120 to generate a boundary distance map 704. The boundary distance map 704 can be color coded to show the normal distance from the edges of the binary segment 120. For example, the colors from outside to inside of the boundary distance map 704, may range from blue, green, yellow, orange, to red in the center of the boundary distance map 704. An oriented saliency extraction may then be performed on the boundary distance map 704 to produce an oriented saliency image 706 of the distance transformation that may have red on one side and blue on the other side, with pixels including magnitude and orientation. For example, the oriented saliency image 706 may be generated using a Gabor saliency. In some examples, the oriented saliency image 706 may show the skeletal structure of the binary image. The oriented saliency image 706 can then have a phase saliency extraction performed thereon to generate a Gabor phase-shifting saliency image

708. For example, the Gabor phase-shifting saliency image 708 shows emphasized pixels at the border of the phase shifting. The Gabor phase-shifting saliency image 708 may further have zero-crossing Laplacian processing performed thereon to generate a zero-crossing Laplacian image 710. The zero-crossing Laplacian image 710 shows detected maximums. The zero-crossing Laplacian image 710 may have modulation applied to generate a modulated image 712. The modulated image 712 shows spurious skeletal segments removed. The modulated saliency image 712 may be processed using non-maxima suppression to generate a discrete skeleton image 714. For example, the discrete skeleton image 714 shows a structural skeleton including an inner skeleton and an outer skeleton as a result of the non-maxima suppression of the modulated saliency image 712. As can be seen in 720, the axis of rotation may be aligned with the geometry of the line segments. Therefore, the binary segment can be detected as corresponding to a free-form revolution object. In some examples, detected regression cues 126, or leaf nodes, may be sent to the contour generator to be used during a regression stage while obtaining contour radial polynomial functions to represent a contour. A 3D model may then be generated as described in detail below.

Figure 8:
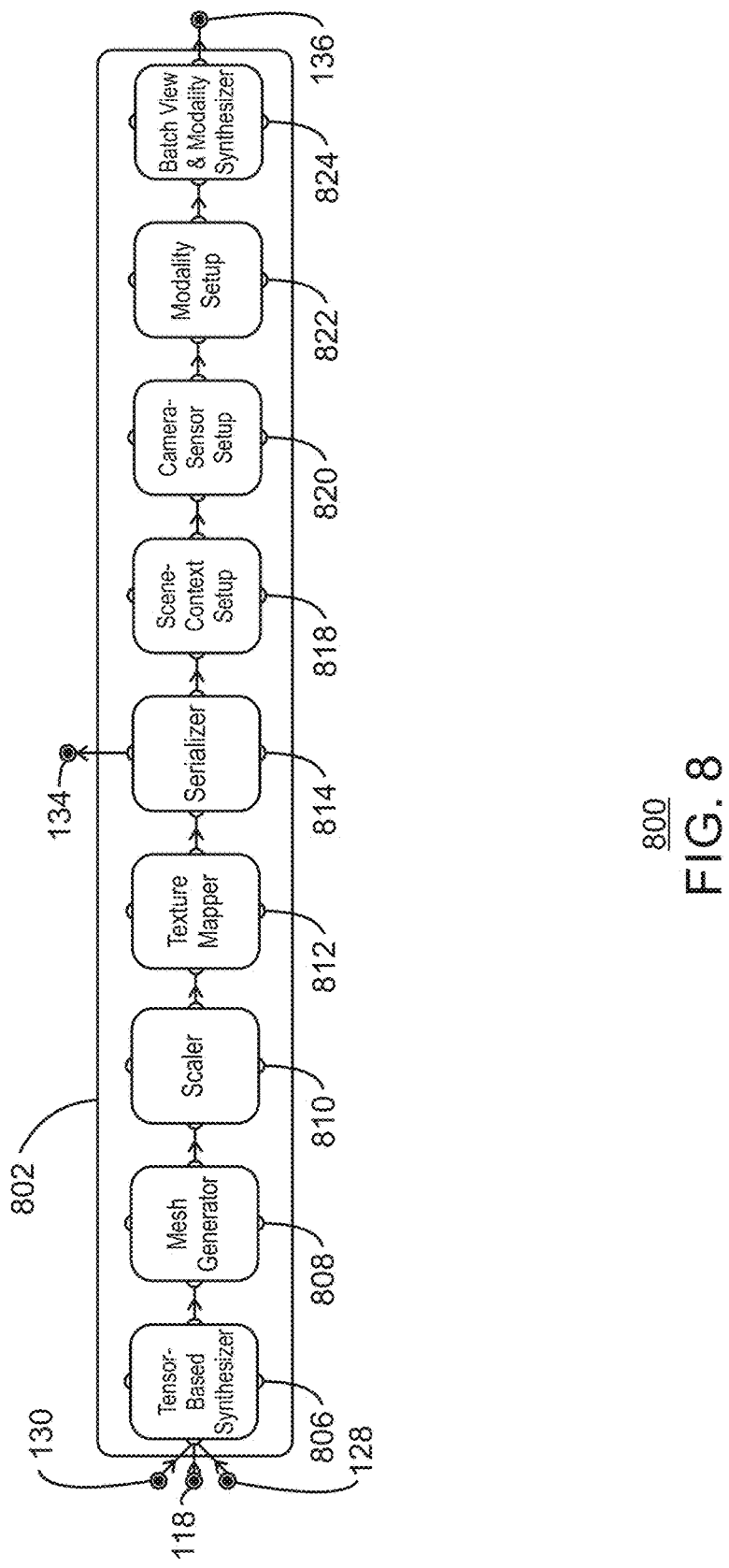
FIG. 8 is a detailed block diagram illustrating an example system that can generate 3D models.

FIG. 8 is a detailed block diagram illustrating an example system that can generate 3D models. The example system is referred to generally by the reference number 800 and can be implemented in the system 100 above or the image processor 1126 of the computing device 1100 below in FIG. 11. The processing performed by the example 3D model generator 802 of system 800 may also referred to herein as a synthesis phase.

In FIG. 8, a tensor-based synthesis process may use the contour 130 and one or more skeleton cues 128 to generate a 3D model by rotating the contour 130 about an axis of rotation. For example, the axis of rotation may be line between two points of rotation. In some examples, the tensor-based synthesizer 806 can integrate the unlimited resolution contour 130 and the skeleton cues 128, including a medial-axis graph and derived axis of rotation, to product a smooth continuous surface based on a rotational tensor. In some examples, a mesh generator 808 may receive a specified resolution angle to generate a 3D mesh based on the resolution angle. For example, a one degree may produce a mesh with 360 blocks, while a 10 degree resolution angle may produce a 3D model with 36 blocks for a more coarse mesh. In some examples, the meshes may be tensor products that are generated very efficiently. In some examples, the mesh generator 808 can perform mesh generation by quad-tessellation using a target resolution in the tensor product. In some examples, the scaler 810 can calculate a pixel to millimeters scale-factor from an object's bounding box and metadata in online repositories. For example, generally one dimension is provided for stock arrangement. The scaler 810 can thus use isotropic scaling of the object's bounding box. In some examples, in the absence of metadata, the scaler 810 can use a barcode on a product to generate scale candidates.

The texture mapper 812 can perform texture mapping by projecting each point of a synthesized mesh to an image plane using normalized coordinates. In some examples, the texture mapper 812 may use alpha blending and defocusing blur at the margin close to an object.

The serializer 814 can perform a highly compact serialization of unlimited resolution 3D models. For example, serializer 814 may receive an image blob to use as a texture map, a collection of contour segments, and a rotation axis. In some examples, the serializer 814 may add a few kilobytes to an input image size, while fully representing the unlimited resolution 3D model. For example, the generation of the mesh using the contour and the skeleton cues may be 70 times faster than loading a mesh file. Thus, the present techniques may be used for automated applications such as robotics, virtual reality, or other potential applications where objects may need to be modeled and identified efficiently.

The scene-context setup 818 can include detecting a camera orientation and placement to be simulated. The camera-sensor setup 820 can include the setting of focal length, resolution, among other settings, of virtual cameras. For example, a virtual camera may be aleatory points of view of the generated 3D model to be used in object free-view rendering. The modality setup 822 can include determining whether the camera includes Red-Green-Blue (RGB), depth (RGBD), laser, or other types of sensors. The batch view and modality synthesizer 824 can detect an amount of images and the type of operating system (OS) storage.

The diagram of FIG. 8 is not intended to indicate that the example 3D model generator 802 is to include all of the components shown in FIG. 8. Rather, the example 3D model generator 802 can be implemented using fewer or additional components not illustrated in FIG. 8 (e.g., additional inputs, processing components, outputs, etc.). Furthermore, although shown in a particular order, in some examples, the components 806-824 may also be arranged in different orders.

Figure 9:
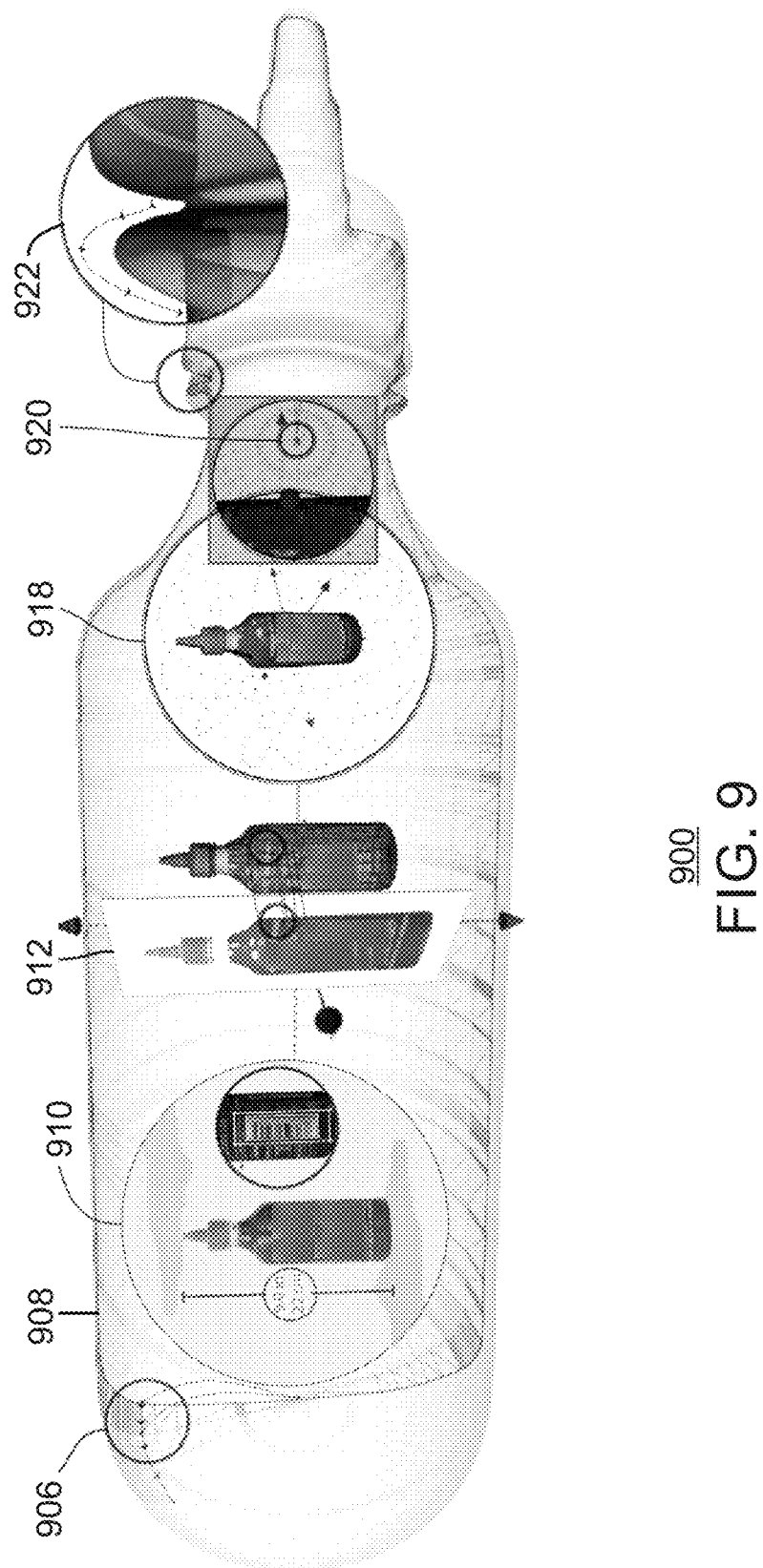
FIG. 9 is an example 3D model generated by the 3D model generator of FIG. 8.

FIG. 9 is an example 3D model generated by the 3D model generator of FIG. 8. The synthesis process used to generate the 3D model as described in FIG. 9 may be referred to generally by the reference number 900.

In FIG. 9, a rotation 906 of a contour around an axis of rotation may produce a mesh 908 based on a specific resolution angle. Scale candidates 910 may be based on metadata from online repositories or bar codes where metadata is lacking. Texture mapping may be performed to project points of a synthesized mesh to an image plane 912. A scene-context setup 918 can detect a camera orientation and placement to be simulated. A virtual camera-sensor setup 920 can set focal length and resolution, among other settings, of one or multiple virtual cameras. A detailed tensor product 922 highlights that a tessellation can be configured to obtain a very high resolution 3D model.

Figure 10:
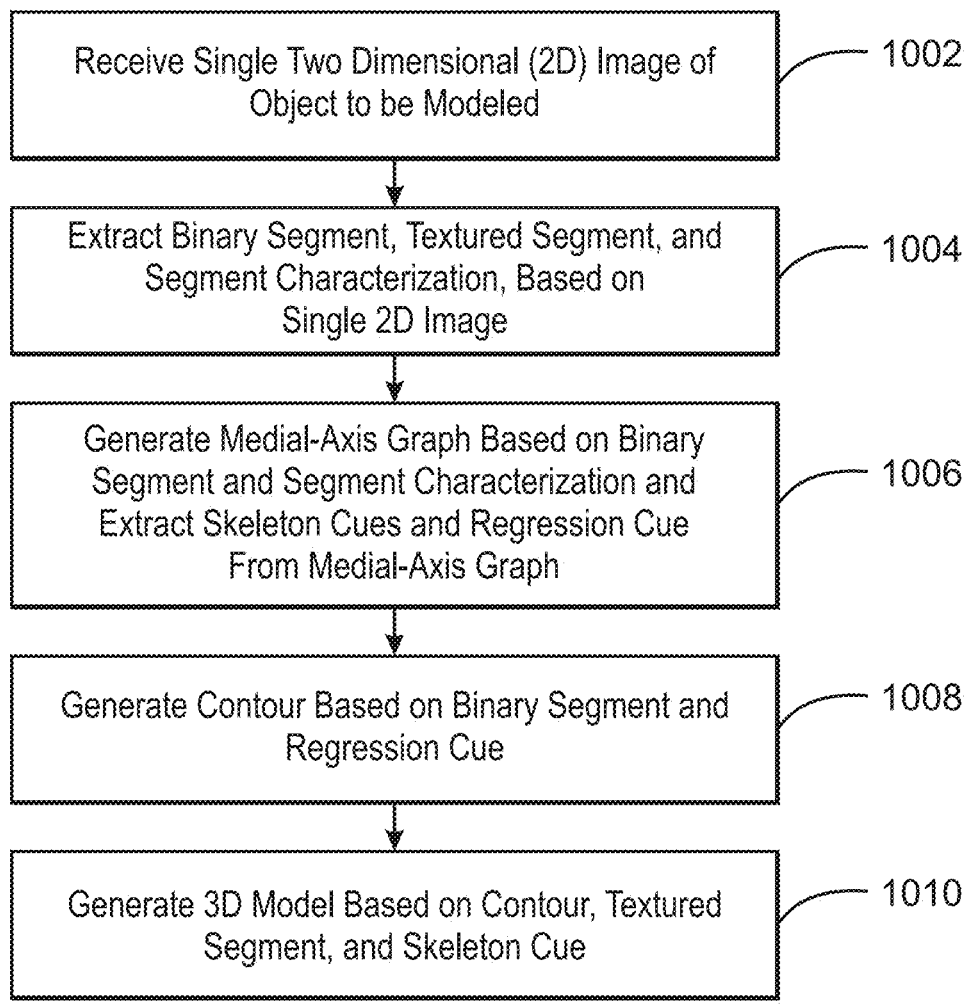
FIG. 10 is a flow chart illustrating a method for generating three dimensional (3D) models based on single 2D images.

FIG. 10 is a flow chart illustrating a method for generating three dimensional (3D) models based on single 2D images. The example method is generally referred to by the reference number 1000 and can be implemented using the system 100 above or the computing device 1100 below. For example, the example method 1000 can be implemented in the image processor 1126 of the computing device 1100.

At block 1002, an image processor receives a single two dimensional (2D) image of an object to be modeled. For example, the object may be a free-form revolution object. In some examples, the image processor may receive the single 2D image of the object from an image repository storing any number of 2D images of objects. For example, the 2D image may be a compressed image with one or more artifacts. In some examples, the image processor may receive the single 2D image from a camera. For example, the image may be an uncompressed RAW image.

At block 1004, the image processor extracts a binary segment, a textured segment, and a segment characterization, based on the single 2D image. In some examples, the image processor can detect a region of interest in the single 2D image. The image processor can then extract the binary segment, the textured segment, and the segment characterization, from the region of interest.

At block 1006, the image processor generates a medial-axis graph based on the binary segment and the segment characterization and extracts skeleton cues and a regression cue from the medial-axis graph. For example, the skeleton cues may include an axis of rotation and a structural invariant cue. For example, the image processor can perform a pixel-wise approximation of a medial-axis-transform (MAT) based on the binary segment. In some examples, the image processor can also detect that the object is a free-form revolution object based on a structural invariant cue. For example, the image processor may detect the object is a free-form revolution object before attempting to generate the 3D model at block 1010 below.

At block 1008, the image processor generates a contour based on the binary segment and the regression cue. For example, the image processor can transform the binary segment into a closed-contour function including a collection of piece-wise function segments. In some examples, the image processor can perform parameter-free segmentation of contour segments based on eccentricity. For example, the image processor can categorize eccentricity nodes into five categories based on eccentricity. In some examples, the image processor can perform a conditional tree expansion to generate a contour graph. In some examples, the image processor can extract shapes from a contour graph using radial polynomial regression.

At block 1010, the image processor generates a 3D model based on the contour and the skeleton cue. For example, the 3D model may be an unlimited resolution 3D model. In some examples, the image processor can generate a mesh based on a received resolution parameter, a received tessellation parameter, and the 3D model. For example, the mesh can be generated in any resolution.

This process flow diagram is not intended to indicate that the blocks of the example method 1000 are to be executed in any particular order, or that all of the blocks are to be included in every case. For example, generating the medial-axis graph and generating the contour can be executed at least partially in parallel. Further, any number of additional blocks not shown may be included within the example method 1000, depending on the details of the specific implementation. For example, the method 1000 may include receiving a second 2D image of the object. For example, the object may be an extrusion object. The extrusion object may then be modeled based on the second 2D image and the received 2D image.

Figure 11:
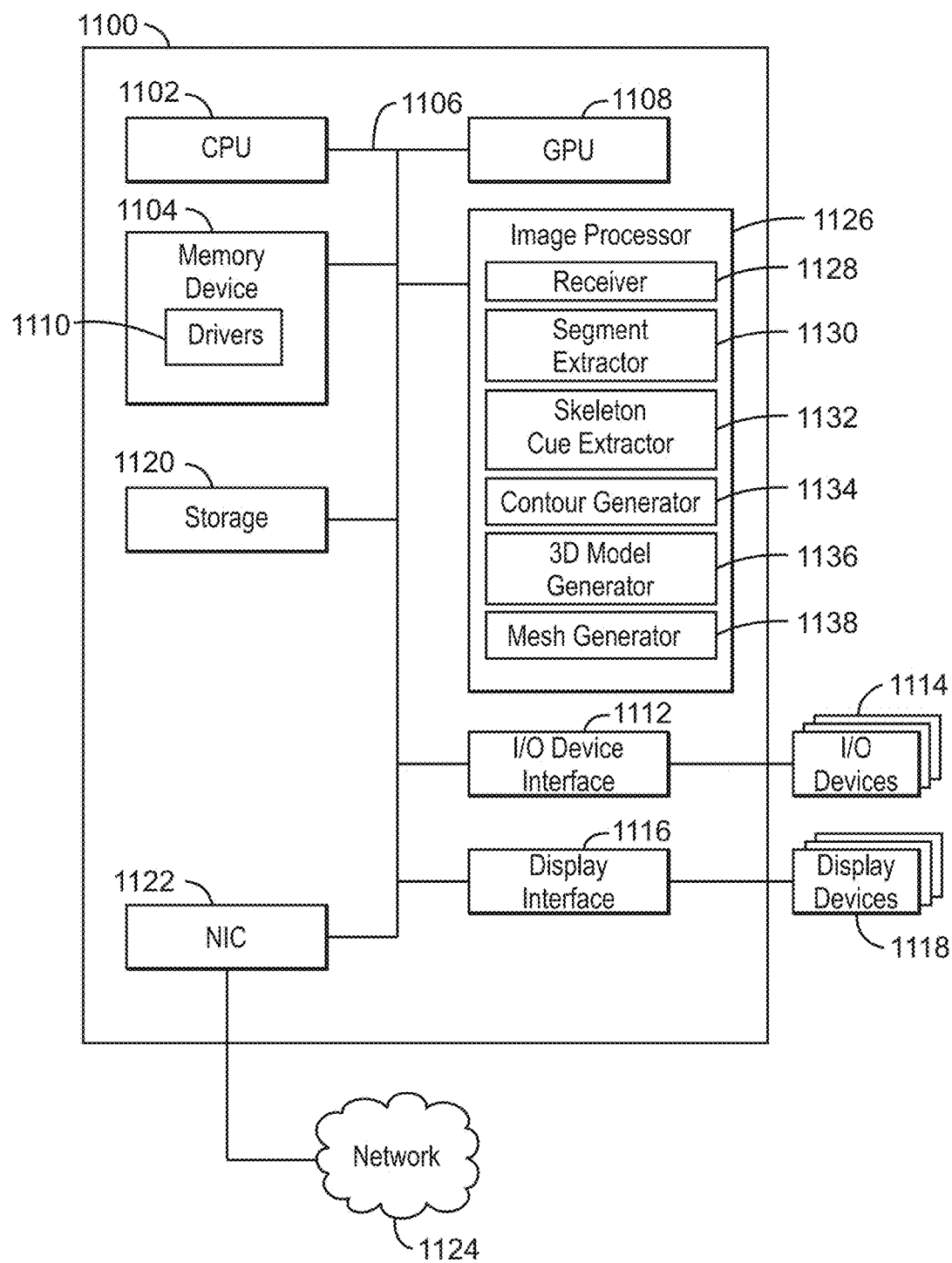
FIG. 11 is a block diagram illustrating an example computing device that can generate three dimensional (3D) models based on single 2D images.

Referring now to FIG. 11, a block diagram is shown illustrating an example computing device that can generate three dimensional (3D) models based on single 2D images. The computing device 1100 may be, for example, a laptop computer, desktop computer, tablet computer, mobile device, wearable device, or smart phone, among others. The computing device 1100 may include a central processing unit (CPU) 1102 that is configured to execute stored instructions, as well as a memory device 1104 that stores instructions that are executable by the CPU 1102. The CPU 1102 may be coupled to the memory device 1104 by a bus 1106. Additionally, the CPU 1102 can be a single core processor, a multi-core processor, a computing cluster, or any number of other configurations. Furthermore, the computing device 1100 may include more than one CPU 1102. In some examples, the CPU 1102 may be a system-on-chip (SoC) with a multi-core processor architecture. In some examples, the CPU 1102 can be a specialized digital signal processor (DSP) used for image processing. The memory device 1104 can include random access memory (RAM), read only memory (ROM), flash memory, or any other suitable memory systems. For example, the memory device 1104 may include dynamic random access memory (DRAM).

The memory device 1104 can include random access memory (RAM), read only memory (ROM), flash memory, or any other suitable memory systems. For example, the memory device 1104 may include dynamic random access memory (DRAM).

The computing device 1100 may also include a graphics processing unit (GPU) 1108. As shown, the CPU 1102 may be coupled through the bus 1106 to the GPU 1108. The GPU 1108 may be configured to perform any number of graphics operations within the computing device 1100. For example, the GPU 1108 may be configured to render or manipulate graphics images, graphics frames, videos, or the like, to be displayed to a user of the computing device 1100.

The memory device 1104 may include device drivers 1110 that are configured to execute the instructions for generating 3D models from 2D images. The device drivers 1110 may be software, an application program, application code, or the like.

The CPU 1102 may also be connected through the bus 1106 to an input/output (I/O) device interface 1112 configured to connect the computing device 1100 to one or more I/O devices 1114. The I/O devices 1114 may include, for example, a keyboard and a pointing device, wherein the pointing device may include a touchpad or a touchscreen, among others. In some examples, the I/O devices may include a camera to capture a two dimensional image of an object and provide the image to the processor 1102 or the image processor 1126. The I/O devices 1114 may be built-in components of the computing device 1100, or may be devices that are externally connected to the computing device 1100. In some examples, the memory 1104 may be communicatively coupled to I/O devices 1114 through direct memory access (DMA).

The CPU 1102 may also be linked through the bus 1106 to a display interface 1116 configured to connect the computing device 1100 to a display device 1118. The display device 1118 may include a display screen that is a built-in component of the computing device 1100. The display device 1118 may also include a computer monitor, television, or projector, among others, that is internal to or externally connected to the computing device 1100.

The computing device 1100 also includes a storage device 1120. The storage device 1120 is a physical memory such as a hard drive, an optical drive, a thumbdrive, an array of drives, a solid-state drive, or any combinations thereof. The storage device 1120 may also include remote storage drives.

The computing device 1100 may also include a network interface controller (NIC) 1122. The NIC 1122 may be configured to connect the computing device 1100 through the bus 1106 to a network 1124. The network 1124 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 1100 further includes an image processor 1126. In some examples, the image processor 1126 may be implemented in a field programmable gate array (FPGA) or an application-specific integrated circuit (ASIC). For example, the image processor 1126 may be configured to perform the techniques described herein. In some examples, the image processor 1126 may be a pipelined processor that may process one or more 2D images simultaneously. For example, the image processor 1126 may receive a 2D image of one object to be modeled and output a 3D model of an object in a previously received single 2D image simultaneously. For example, the single 2D image can be an object with a main axis partially aligned to a camera frame. In some examples, the 2D image can be received from a web repository. In some examples, the object may be a free-form revolution object. The image processor 1126 can include a receiver 1128 to receive a single two dimensional (2D) image of an object to be modeled. The image processor 1126 can further include a segment extractor 1130 to extract a binary segment, a textured segment, and a segment characterization based on the single 2D image. The image processor 1126 can further include a skeleton cue extractor 1132 to generate a medial-axis transform (MAT) approximation based on the binary segment and the segment characterization and extract a skeleton cue and a regression cue from the MAT approximation. For example, the skeleton cue can include a rotation axis. In some examples, the MAT approximation can be a graph computed using adaptive convolution filtering. In some examples, the skeleton cue extractor 1132 can also detect that the object is a free-form revolution object based on a structural invariant cue. The image processor 1126 can further include a contour generator 1134 to generate a contour based on the binary segment and the regression cue. For example, the contour can include a continuous function including a collection of piece-wise function segments. In some examples, the generated contour may be an unlimited resolution contour. The image processor 1126 can further include a 3D model generator 1136 to generate a 3D model based on the contour, the textured segment, and the skeleton cue. The image processor 1126 can further include a mesh generator 1138 to generate a mesh based on the 3D model and a resolution parameter.

The block diagram of FIG. 11 is not intended to indicate that the computing device 1100 is to include all of the components shown in FIG. 11. Rather, the computing device 1100 can include fewer or additional components not illustrated in FIG. 11, such as additional buffers, additional processors, and the like. The computing device 1100 may include any number of additional components not shown in FIG. 11, depending on the details of the specific implementation. Furthermore, any of the functionalities of the receiver 1128, the segment extractor 1130, the skeleton cue extractor 1132, the contour generator 1134, or the 3D model generator 1136, may be partially, or entirely, implemented in hardware and/or in a processor. For example, the functionality of the image processor may be implemented with an application specific integrated circuit, in logic implemented in a processor, in logic implemented in a specialized graphics processing unit such as the image processor 1126, or in any other device.

Figure 12:
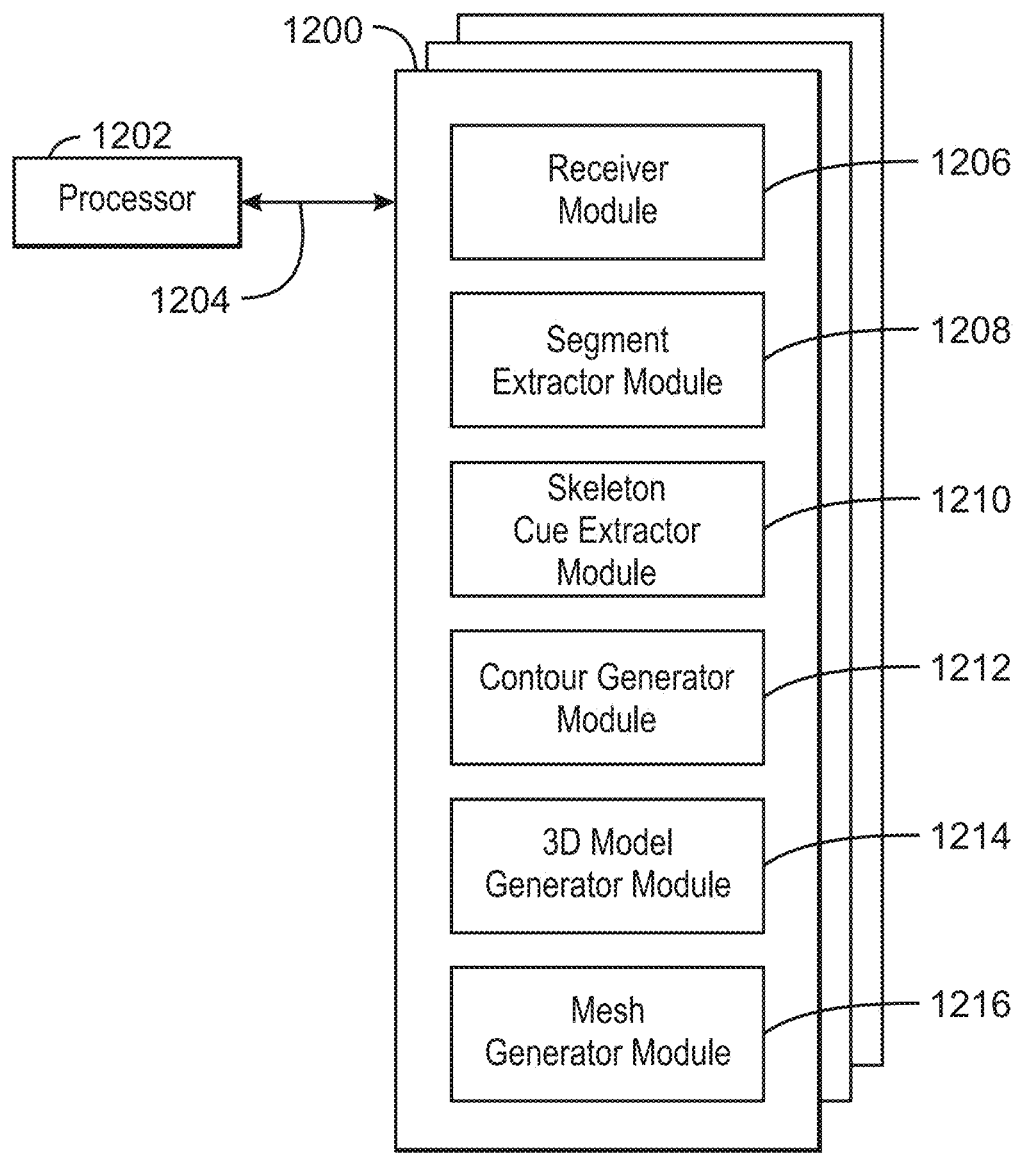
FIG. 12 is a block diagram showing computer readable media that store code for generating three dimensional (3D) models based on single 2D images.

FIG. 12 is a block diagram showing computer readable media 1200 that store code for generating three dimensional (3D) models based on single 2D images. The computer readable media 1200 may be accessed by a processor 1202 over a computer bus 1204. Furthermore, the computer readable medium 1200 may include code configured to direct the processor 1202 to perform the methods described herein. In some embodiments, the computer readable media 1200 may be non-transitory computer readable media. In some examples, the computer readable media 1200 may be storage media. However, in any case, the computer readable media do not include transitory media such as carrier waves, signals, and the like.

The various software components discussed herein may be stored on one or more computer readable media 1200, as indicated in FIG. 12. For example, a receiver module 1206 may be configured to receive a single two dimensional (2D) image of an object to be modeled. For example, the single 2D image may be received from a camera or an image repository. In some examples, the receiver module 1206 may also detect a region of interest in the single 2D image. For example, the region of interest may correspond to an object in the image to be modeled. A segment extractor module 1208 may be configured to extract a binary segment, a textured segment, and a segment characterization, from the region of interest. In some examples, the segment extractor module 1208 may be configured to perform speckle removal. In some examples, the segment extractor module 1208 may generate a texture map. For example, the texture map may be used to fit the textured segment to a generated 3D model. In some examples, the segment characterization may include a center of mass and one or more canonical axes. A skeleton cue extractor module 1210 may be configured to generate a medial-axis graph based on the binary segment and the segment characterization. For example, the skeleton cue extractor 1210 can generate the medial-axis graph based on a phase-shifting saliency from a distance transformation. In some examples, the skeleton cue extractor 1210 can generate a boundary distance map based on the binary segment and the segment characterization. The skeleton cue extractor can then extract a skeleton cue and a regression cue from the medial-axis graph. In some examples, the skeleton cue extractor module 1210 may be configured to detect that the object is a free-form revolution object based on a structural invariant cue. For example, the skeleton cue extractor module 1210 may be configured to detect that the object is a free-form revolution object via a validation of an axis of rotation based on the structural invariant cue. A contour generator module 1212 may be configured to generate a contour based on the binary segment and the regression cue. For example, the contour generator module 1212 can generate the contour based on eccentricity. In some examples, the contour generator module 1212 can categorize eccentricity nodes into five categories based on eccentricity. In some examples, the contour generator module 1212 can extract shapes from a contour graph using radial polynomial regression. In some examples, the contour generator module 1212 can perform a saliency extraction on the binary segment to generate a discrete contour. In some examples, the contour generator module 1212 can perform dual non-maximum suppression on a discrete contour to generate a discrete edge. In some examples, the contour generator module 1212 can perform contour sub-pixel optimization on a discrete edge to generate an oriented gradient. In some examples, the contour generator module 1212 can perform conditional graph expansion on an oriented gradient to generate a contour segment. A 3D model generator 1214 may be configured to generate a 3D model based on the contour, the textured segment, and the skeleton cue.

In some examples, a mesh generator module 1216 may be configured to receive a resolution parameter and a tessellation parameter. The mesh generator module 1216 may also be configured to generate a mesh with a resolution and a tessellation based on the 3D model, the resolution parameter, and the tessellation parameter.

The block diagram of FIG. 12 is not intended to indicate that the computer readable media 1200 is to include all of the components shown in FIG. 12. Further, the computer readable media 1200 may include any number of additional components not shown in FIG. 12, depending on the details of the specific implementation.

EXAMPLES

Example 1 is a system for generating a three dimensional (3D) model. The system includes a receiver to receive a single two dimensional (2D) image of an object to be modeled. The system includes a segment extractor to extract a binary segment, a textured segment, and a segment characterization based on the single 2D image. The system includes a skeleton cue extractor to generate a medial-axis transform (MAT) approximation based on the binary segment and the segment characterization and extract a skeleton cue and a regression cue from the MAT approximation. The system includes a contour generator to generate a contour based on the binary segment and the regression cue. The system includes a 3D model generator to generate a 3D model based on the contour, the textured segment, and the skeleton cue.

Example 2 includes the system of example 1, including or excluding optional features. In this example, the MAT approximation includes a graph computed using adaptive convolution filtering.

Example 3 includes the system of any one of examples 1 to 2, including or excluding optional features. In this example, the skeleton cue extractor is to further detect that the object is a free-form revolution object based on a structural invariant cue.

Example 4 includes the system of any one of examples 1 to 3, including or excluding optional features. In this example, the skeleton cue includes a rotation axis.

Example 5 includes the system of any one of examples 1 to 4, including or excluding optional features. In this example, the contour includes a continuous function including a collection of piece-wise function segments.

Example 6 includes the system of any one of examples 1 to 5, including or excluding optional features. In this example, the single 2D image includes an object with a main axis partially aligned to a camera frame.

Example 7 includes the system of any one of examples 1 to 6, including or excluding optional features. In this example, the system includes a mesh generator to generate a mesh based on the 3D model and a resolution parameter.

Example 8 includes the system of any one of examples 1 to 7, including or excluding optional features. In this example, the generated contour includes an unlimited resolution contour.

Example 9 includes the system of any one of examples 1 to 8, including or excluding optional features. In this example, the two dimensional image is to be received from a web repository.

Example 10 includes the system of any one of examples 1 to 9, including or excluding optional features. In this example, the system includes a camera to capture the two dimensional image of an object and provide the image to the processor.

Example 11 is a method for generating a three dimensional (3D) model. The method includes receiving, via a processor, a single two dimensional (2D) image of an object to be modeled. The method includes extracting, via the processor, a binary segment, a textured segment, and a segment characterization, from the single 2D image. The method includes generating, via the processor, a medial-axis graph based on the binary segment and the segment characterization and extracting a skeleton cue and a regression cue from the medial-axis graph. The method includes generating, via the processor, a contour based on the binary segment and the regression cue. The method includes generating, via the processor, a 3D model based on the contour, the textured segment, and the skeleton cue.

Example 12 includes the method of example 11, including or excluding optional features. In this example, generating the contour includes transforming the binary segment into a closed-contour function including a collection of piece-wise function segments.

Example 13 includes the method of any one of examples 11 to 12, including or excluding optional features. In this example, generating the contour includes performing parameter-free segmentation of contour segments based on eccentricity.

Example 14 includes the method of any one of examples 11 to 13, including or excluding optional features. In this example, the method includes generating, via the processor, a mesh based on a received resolution parameter, a received tessellation parameter, and the 3D model.

Example 15 includes the method of any one of examples 11 to 14, including or excluding optional features. In this example, the method includes detecting a region of interest based on the single 2D image, wherein the binary segment, the textured segment, and the segment characterization, are to be extracted from the region of interest.

Example 16 includes the method of any one of examples 11 to 15, including or excluding optional features. In this example, generating the medial-axis graph and generating the contour are executed at least partially in parallel.

Example 17 includes the method of any one of examples 11 to 16, including or excluding optional features. In this example, the method includes receiving a second 2D image of the object, wherein the object is an extrusion object, and wherein the extrusion object is to be modeled based on the second 2D image and the received 2D image.

Example 18 includes the method of any one of examples 11 to 17, including or excluding optional features. In this example, generating the contour includes performing a conditional tree expansion.

Example 19 includes the method of any one of examples 11 to 18, including or excluding optional features. In this example, generating the contour includes categorizing eccentricity nodes into five categories.

Example 20 includes the method of any one of examples 11 to 19, including or excluding optional features. In this example, generating the contour includes extracting shapes from a contour graph using radial polynomial regression.

Example 21 is at least one computer readable medium for generating a three dimensional (3D) model having instructions stored therein that direct the processor to receive a single two dimensional (2D) image of an object to be modeled. The instructions also direct the processor to detect a region of interest in the single 2D image. The instructions also direct the processor to extract a binary segment, a textured segment, and a segment characterization, from the region of interest. The instructions also direct the processor to generate medial-axis graph based on the binary segment and the segment characterization. The instructions also direct the processor to extract a skeleton cue and a regression cue from the medial-axis graph. The instructions also direct the processor to generate a contour based on the binary segment and the regression cue. The instructions also direct the processor to generate a 3D model based on the contour, the textured segment, and the skeleton cue.

Example 22 includes the computer-readable medium of example 21, including or excluding optional features. In this example, the computer-readable medium includes instructions to generate the contour based on eccentricity.

Example 23 includes the computer-readable medium of any one of examples 21 to 22, including or excluding optional features. In this example, the computer-readable medium includes instructions to generate the medial-axis graph based on a phase-shifting saliency from a distance transformation.

Example 24 includes the computer-readable medium of any one of examples 21 to 23, including or excluding optional features. In this example, the computer-readable medium includes instructions to categorize eccentricity nodes into five categories based on eccentricity.

Example 25 includes the computer-readable medium of any one of examples 21 to 24, including or excluding optional features. In this example, the computer-readable medium includes instructions to generate a boundary distance map based on the binary segment and the segment characterization.

Example 26 includes the computer-readable medium of any one of examples 21 to 25, including or excluding optional features. In this example, the computer-readable medium includes instructions to extract shapes from a contour graph using radial polynomial regression.

Example 27 includes the computer-readable medium of any one of examples 21 to 26, including or excluding optional features. In this example, the computer-readable medium includes instructions to perform a saliency extraction on the binary segment to generate a discrete contour.

Example 28 includes the computer-readable medium of any one of examples 21 to 27, including or excluding optional features. In this example, the computer-readable medium includes instructions to perform dual non-maximum suppression on a discrete contour to generate a discrete edge.

Example 29 includes the computer-readable medium of any one of examples 21 to 28, including or excluding optional features. In this example, the computer-readable medium includes instructions to perform contour sub-pixel optimization on a discrete edge to generate an oriented gradient.

Example 30 includes the computer-readable medium of any one of examples 21 to 29, including or excluding optional features. In this example, the computer-readable medium includes instructions to perform conditional graph expansion on an oriented gradient to generate a contour segment.

Example 31 is a system for generating a three dimensional (3D) model. The system includes means for receiving a single two dimensional (2D) image of an object to be modeled. The system includes means for extracting a binary segment, a textured segment, and a segment characterization based on the single 2D image. The system includes means for generating a medial-axis transform (MAT) approximation based on the binary segment and the segment characterization and extract a skeleton cue and a regression cue from the MAT approximation. The system includes means for generating a contour based on the binary segment and the regression cue. The system includes means for generating a 3D model based on the contour, the textured segment, and the skeleton cue.

Example 32 includes the system of example 31, including or excluding optional features. In this example, the MAT approximation includes a graph computed using adaptive convolution filtering.

Example 33 includes the system of any one of examples 31 to 32, including or excluding optional features. In this example, the means for generating the MAT approximation is to further detect that the object is a free-form revolution object based on a structural invariant cue.

Example 34 includes the system of any one of examples 31 to 33, including or excluding optional features. In this example, the skeleton cue includes a rotation axis.

Example 35 includes the system of any one of examples 31 to 34, including or excluding optional features. In this example, the contour includes a continuous function including a collection of piece-wise function segments.

Example 36 includes the system of any one of examples 31 to 35, including or excluding optional features. In this example, the single 2D image includes an object with a main axis partially aligned to a camera frame.

Example 37 includes the system of any one of examples 31 to 36, including or excluding optional features. In this example, the system includes means for generating a mesh based on the 3D model and a resolution parameter.

Example 38 includes the system of any one of examples 31 to 37, including or excluding optional features. In this example, the generated contour includes an unlimited resolution contour.

Example 39 includes the system of any one of examples 31 to 38, including or excluding optional features. In this example, the two dimensional image is to be received from a web repository.

Example 40 includes the system of any one of examples 31 to 39, including or excluding optional features. In this example, the system includes a camera to capture the two dimensional image of an object and provide the image to the processor.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for generating a three dimensional (3D) model, comprising a processor to:
   receive a single two dimensional (2D) image of an object to be modeled;
   extract a binary segment, a textured segment, and a segment characterization based on the single 2D image;
   generate a medial-axis transform (MAT) approximation based on the binary segment and the segment characterization and extract a skeleton cue and a regression cue from the MAT approximation, wherein the skeleton cue comprises a rotation axis;
   generate a contour based on the binary segment and the regression cue; and
   generate a 3D model based on the contour, the textured segment, and the skeleton cue.

2. The system of claim 1, wherein the MAT approximation comprises a graph computed using adaptive convolution filtering.

3. The system of claim 1, wherein the processor is to detect that the object is a free-form revolution object based on a structural invariant cue.

4. The system of claim 1, wherein the contour comprises a continuous function comprising a collection of piece-wise function segments.

5. The system of claim 1, wherein the single 2D image comprises an object with a main axis partially aligned to a camera frame.

6. The system of claim 1, wherein the processor is to generate a mesh based on the 3D model and a resolution parameter.

7. The system of claim 1, wherein the generated contour comprises an unlimited resolution contour.

8. The system of claim 1, wherein the two dimensional image is to be received from a web repository.

9. The system of claim 1, comprising a camera to capture the two dimensional image of an object and provide the image to the processor.

10. A method for generating a three dimensional (3D) model, comprising:
    receiving, via a processor, a single two dimensional (2D) image of an object to be modeled;
    extracting, via the processor, a binary segment, a textured segment, and a segment characterization, from the single 2D image;
    generating, via the processor, a medial-axis graph based on the binary segment and the segment characterization and extracting a skeleton cue and a regression cue from the medial-axis graph;
    generating, via the processor, a contour based on the binary segment and the regression cue, wherein generating the contour comprises transforming the binary segment into a closed-contour function comprising a collection of piece-wise function segments; and
    generating, via the processor, a 3D model based on the contour, the textured segment, and the skeleton cue.

11. The method of claim 10, wherein generating the contour comprises performing parameter-free segmentation of contour segments based on eccentricity.

12. The method of claim 10, comprising generating, via the processor, a mesh based on a received resolution parameter, a received tessellation parameter, and the 3D model.

13. The method of claim 10, comprising detecting a region of interest based on the single 2D image, wherein the binary segment, the textured segment, and the segment characterization, are to be extracted from the region of interest.

14. The method of claim 10, wherein generating the medial-axis graph and generating the contour are executed in parallel.

15. The method of claim 10, comprising receiving a second 2D image of the object, wherein the object is an extrusion object, and wherein the extrusion object is to be modeled based on the second 2D image and the received 2D image.

16. At least one non-transitory computer readable medium for generating a three dimensional (3D) model having instructions stored therein that, in response to being executed on a processor, cause the processor to:
    receive a single two dimensional (2D) image of an object to be modeled;
    detect a region of interest in the single 2D image;
    extract a binary segment, a textured segment, and a segment characterization, from the region of interest;
    generate medial-axis graph based on the binary segment and the segment characterization;
    extract a skeleton cue and a regression cue from the medial-axis graph;
    generate a contour based on the binary segment, the regression cue, and eccentricity; and
    generate a 3D model based on the contour, the textured segment, and the skeleton cue.

17. The at least one non-transitory computer readable medium of claim 16, comprising instructions to generate the medial-axis graph based on a phase-shifting saliency from a distance transformation.

* * * * *